United States Patent
Hong et al.

(10) Patent No.: US 11,917,339 B2
(45) Date of Patent: Feb. 27, 2024

(54) LIGHT ENGINE AND PROJECTION DEVICE

(71) Applicant: LARGAN PRECISION CO., LTD., Taichung (TW)

(72) Inventors: Yu Jie Hong, Taichung (TW); Chun-Che Hsueh, Taichung (TW); Fuh-Shyang Yang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 33 days.

(21) Appl. No.: 17/685,900

(22) Filed: Mar. 3, 2022

(65) Prior Publication Data
US 2023/0216996 A1 Jul. 6, 2023

(30) Foreign Application Priority Data
Jan. 3, 2022 (TW) .................................. 111100071

(51) Int. Cl.
| | |
|---|---|
| H04N 9/31 | (2006.01) |
| G02B 26/08 | (2006.01) |
| G03B 21/00 | (2006.01) |
| G03B 21/16 | (2006.01) |
| G03B 21/20 | (2006.01) |

(52) U.S. Cl.
CPC ....... H04N 9/3152 (2013.01); G02B 26/0833 (2013.01); G03B 21/005 (2013.01); G03B 21/16 (2013.01); G03B 21/2066 (2013.01)

(58) Field of Classification Search
CPC .............. H04N 9/3152; G02B 26/0833; G03B 21/005; G03B 21/16; G03B 21/2066
See application file for complete search history.

(56) References Cited

U.S. PATENT DOCUMENTS

| | | | |
|---|---|---|---|
| 6,788,841 B2 | 9/2004 | Mearini et al. | |
| 7,522,643 B2 | 4/2009 | Miyajima et al. | |
| 8,159,624 B2 | 4/2012 | Endo | |
| 9,462,255 B1 * | 10/2016 | Marason | G01S 17/86 |

(Continued)

FOREIGN PATENT DOCUMENTS

| | | |
|---|---|---|
| CN | 101702072 A | 5/2010 |
| CN | 105404009 A | 3/2016 |

(Continued)

OTHER PUBLICATIONS

TW Office Action in Application No. 111100071 dated Jul. 4, 2022.

*Primary Examiner* — Magda Cruz
(74) *Attorney, Agent, or Firm* — Maschoff Brennan

(57) ABSTRACT

A light engine includes an image surface, a projected light surface, a projection lens assembly, and a plurality of folding elements. The image surface has three image areas. The projected light surface has three light sources that provide light with different wavelengths. The plurality of folding elements are arranged along a light emitting axis. The image surface and the projected light surface are substantially in parallel with the light emitting axis, and there is an air gap located between the image surface and the projected light surface. The three light sources respectively correspond to the plurality of folding elements and respectively correspond to the three image areas, and the light emitting axis and the projection lens assembly are disposed on the same optical path.

26 Claims, 12 Drawing Sheets

(56) References Cited

U.S. PATENT DOCUMENTS

| | | |
|---|---|---|
| 9,560,281 B2 | 1/2017 | Short |
| 9,904,154 B2 | 2/2018 | Hsu et al. |
| 10,230,928 B2 | 3/2019 | Yubarsky et al. |
| 10,962,868 B2 | 3/2021 | Chen et al. |
| 2007/0035930 A1 | 2/2007 | Sung et al. |
| 2010/0110383 A1 | 5/2010 | Tang |
| 2010/0295070 A1 | 11/2010 | Su et al. |
| 2011/0304828 A1* | 12/2011 | Khechana .......... G02B 26/0833 353/20 |
| 2023/0080616 A1* | 3/2023 | Huang ................ G02B 3/04 359/714 |

FOREIGN PATENT DOCUMENTS

| | | | | |
|---|---|---|---|---|
| CN | 107203087 A | * | 9/2017 | ............ G03B 21/16 |
| CN | 209417511 U | * | 9/2019 | ......... G03B 21/2033 |
| CN | 110426849 A | | 11/2019 | |
| TW | 200731881 A | | 8/2007 | |
| TW | I345933 B | | 7/2011 | |
| TW | 201126777 A | | 8/2011 | |
| TW | M409452 U | | 8/2011 | |
| TW | 201324880 A | | 6/2013 | |
| TW | I504028 B | | 10/2015 | |
| TW | 201217446 A | | 3/2017 | |
| TW | 201708770 A | | 3/2017 | |
| TW | I591290 B | | 7/2017 | |
| TW | 202030522 A | * | 8/2020 | ............ G02B 27/10 |
| TW | 202030522 A | | 8/2020 | |
| TW | 202113429 A | | 4/2021 | |

\* cited by examiner

LIGHT ENGINE AND PROJECTION DEVICE

RELATED APPLICATIONS

This application claims priority to Taiwan Application 111100071, filed on Jan. 3, 2022, which is incorporated by reference herein in its entirety.

BACKGROUND

Technical Field

The present disclosure relates to a light engine and a projection device, more particularly to a light engine applicable to a projection device.

Description of Related Art

In the recent years, projection devices become more popular than ever. For example, the projection devices can be applied in conferences or video game entertainment. Furthermore, due to the wide use, the projection devices trend to meet more requirements, wherein the requirement of miniaturization for the projection devices has been increasing.

In order to achieve good image and color quality, the projection device will be provided with a beam splitter, a folding element, a light combination device, etc., which increases the size of the projection device and thus is unfavorable for the miniaturization. Also, the miniaturization of the projection device would cause reduction in heat dissipation, so that the power of light sources would be restricted for preventing keeping increasing the temperature inside the projection device. Therefore, how to improve the configuration inside the projection device or increase heat dissipation ability so as to achieve miniaturization of the projection device without affecting the power of the light sources has become an important issue in this field.

SUMMARY

According to one aspect of the present disclosure, a light engine includes an image surface, a projected light surface, a projection lens assembly, and a plurality of folding elements. The image surface includes a first image area, a second image area, and a third image area. The projected light surface includes a first light source, a second light source, and a third light source, and the first light source, the second light source, and the third light source provide light with different wavelengths. The plurality of folding elements include a first folding element, a second folding element, and a third folding element that are arranged along a light emitting axis. The image surface and the projected light surface are substantially in parallel with the light emitting axis, and there is an air gap located between the image surface and the projected light surface. The first light source corresponds to the first folding element and the first image area, the second light source corresponds to the second folding element and the second image area, the third light source corresponds to the third folding element and the third image area, and the light emitting axis and the projection lens assembly are disposed on the same optical path.

According to another aspect of the present disclosure, a projection device includes a circuit board, a light engine, a casing, and a heat dissipation device. The light engine is disposed on the circuit board. The light engine includes an image surface, a projected light surface, a projection lens assembly, and a plurality of folding elements. The image surface includes a first image area, a second image area, and a third image area. The projected light surface includes a first light source, a second light source, and a third light source, and the first light source, the second light source, and the third light source provide light with different wavelengths. The plurality of folding elements include a first folding element, a second folding element, and a third folding element that are arranged along a light emitting axis. The image surface and the projected light surface are substantially in parallel with the light emitting axis, and there is an air gap located between the image surface and the projected light surface. The first light source corresponds to the first folding element and the first image area, the second light source corresponds to the second folding element and the second image area, the third light source corresponds to the third folding element and the third image area, and the light emitting axis and the projection lens assembly are disposed on the same optical path. The casing encloses the circuit board and the light engine. The heat dissipation device is connected to the casing.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
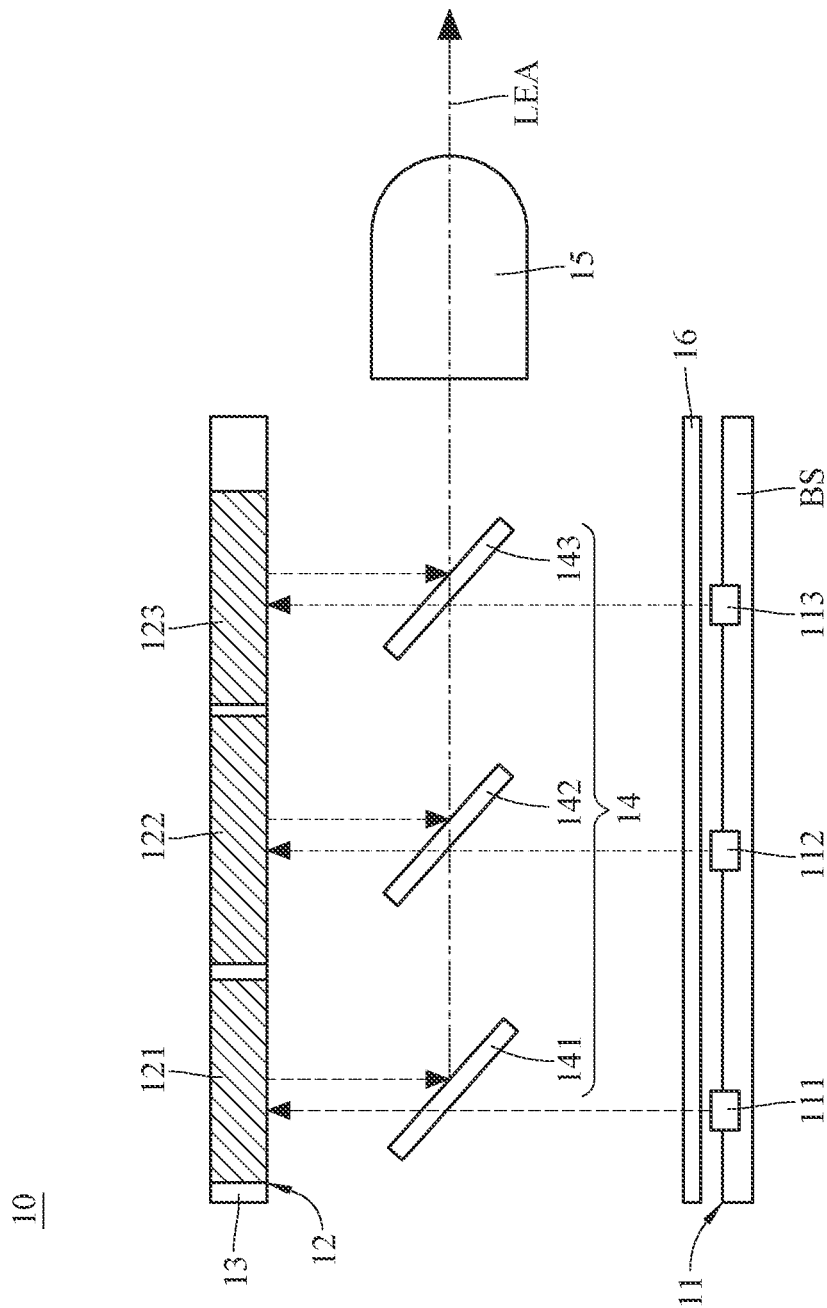
FIG. 1 is a schematic view of a light engine according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides a light engine that includes a projected light surface, an image surface, a plurality of folding elements, and a projection lens assembly.

The projected light surface includes a first light source, a second light source, and a third light source. The first light source, the second light source, and the third light source provide light with different wavelengths.

At least one of the three light sources can be a laser light source. Therefore, it is favorable for increasing brightness and the color gamut of the projected image. Moreover, the laser light source can be a vertical-cavity surface-emitting laser (VCSEL). Therefore, it is favorable for configuring the light sources and increasing flexibility of optical path design. Please refer to FIG. 1, which shows the three light sources 111, 112, and 113 that each can be a VCSEL according to the 1st embodiment of the present disclosure.

Alternatively, at least one of the three light sources can include mini-light-emitting diodes (mini-LEDs). Therefore, it is favorable for increasing brightness of the projected light surface and shade uniformity of the overall image. Furthermore, at least one of the three light sources can include micro light emitting diodes (micro-LEDs). Therefore, it is favorable for reducing the thickness of the projected light surface and heat generated by the light engine. Furthermore, at least one of the three light sources can include micro organic light emitting diodes (micro-OLEDs). Therefore, it is favorable for further reducing the thickness of the projected light surface and heat generated by the light engine. Please refer to FIG. 9, which shows three groups of light sources 711, 712, and 713 that each can include mini-light-emitting diodes, micro light emitting diodes, or micro organic light emitting diodes among the projected light surface 71 that can be a panel light source according to the 7th embodiment of the present disclosure.

There can be an air gap located between the image surface and the projected light surface. The image surface includes a first image area, a second image area, and a third image area.

The plurality of folding elements include a first folding element, a second folding element, and a third folding element that are arranged along a light emitting axis.

The plurality of folding elements can be disposed between the projected light surface and the image surface. Therefore, it is favorable for preventing using a prism to combine the three light rays so as to reduce difficulty of manufacturing and assembly and preventing blurred image generated by the prism tolerance during combination of the three light rays. Please refer to FIG. 1, which shows the plurality of folding elements 141, 142, and 143 located between the projected light surface 11 and the image surface 12 according to the 1st embodiment of the present disclosure.

Alternatively, the plurality of folding elements can be disposed at the same side of the projected light surface and the image surface. Specifically, the image surface can be disposed between the projected light surface and the plurality of folding elements. By configuring the projected light surface adjacent to the image surface, it is favorable for providing image with highly uniform brightness at various wavelengths, and reducing difficulty of manufacturing and assembly so as to further reduce the size of the light engine. Please refer to FIG. 8, which shows the image surface 62 located between the projected light surface 61 and the plurality of folding elements 641, 642, and 643 according to the 6th embodiment of the present disclosure.

When the plurality of folding elements are disposed between the projected light surface and the image surface, at least one of the plurality of folding elements can be a reflective polarizing element. Therefore, it is favorable for effectively configuring and collecting light rays from different light sources so as to further reduce the size of the light engine. Please refer to FIG. 1, which shows the second folding element 142 that can be a reflective polarizing element according to the 1st embodiment of the present disclosure. Alternatively, at least one of the plurality of folding elements can be a beam splitter. Please refer to FIG. 1, which shows the first folding element 141 and the third folding element 143 that each can be a beam splitter according to the 1st embodiment of the present disclosure.

When the image surface is disposed between the projected light surface and the plurality of folding elements, at least one of the plurality of folding elements can be a reflective element such as a prism or a reflective mirror. Therefore, it is favorable for configuring optical path and combining light rays with different wavelengths. Please refer to FIG. 8, which shows the first folding element 641 that can be a reflective mirror according to the 6th embodiment of the present disclosure. Alternatively, at least one of the plurality of folding elements can be a dichroic mirror. Therefore, it is favorable for collecting light rays with different wavelengths for combination and filtering stray light. Please refer to FIG. 8, which shows the second folding element 642 that can be a dichroic mirror according to the 6th embodiment of the present disclosure.

The projection lens assembly and the light emitting axis are disposed on the same optical path. The projection lens assembly can have at least one metalens. Therefore, it is favorable for reducing the size of the projection lens assembly and providing projection surface with a large field of view. Please refer to FIG. 10, which shows the projection lens assembly 85 having the metalens 851 according to the 8th embodiment of the present disclosure.

The projected light surface and the image surface are substantially in parallel with the light emitting axis. The first light source corresponds to the first image area and the first folding element, the second light source corresponds to the second image area and the second folding element, and the third light source corresponds to the third image area and the third folding element.

By disposing the three light sources on the same projected light surface and disposing the three image areas on the same image surface, it is favorable for reducing the size of the light engine.

According to the present disclosure, the light engine can further include an image providing device. The image providing device has a front surface and a rear surface, and the image surface can be located on the front surface of the image providing device. The three image areas can be provided by the same image providing device, but the present disclosure is not limited thereto. The three images areas can also be provided by three image providing devices. Note that the front surface of the image providing device refers to the light incident surface, and the rear surface of the image providing device refers to the surface opposite to the front surface.

When the plurality of folding elements are disposed between the projected light surface and the image surface, the image providing device can include a digital micromirror device (DMD). By configuring the digital micromirror device included in the image providing device, it is favorable for having a relatively small size of the light engine. Please refer to FIG. 1, which shows the image providing device 13 that can include a digital micromirror device according to the 1st embodiment of the present disclosure. Alternatively, the image providing device can include a display with liquid crystal on silicon (LCoS). By configuring the liquid-crystal-on-silicon display in the image providing device, it is favorable for providing better resolution and image quality. Please refer to FIG. 4, which shows the image providing device 23 that can include a display with liquid crystal on silicon according to the 2nd embodiment of the present disclosure.

When the image surface is disposed between the projected light surface and the plurality of folding elements, the image providing device can include a liquid-crystal display (LCD). Therefore, it is favorable for having better color saturation of the light engine. Please refer to FIG. 8, which shows the image providing device 63 that can include a liquid-crystal display according to the 6th embodiment of the present disclosure.

When the image providing device includes a digital micromirror device, the image providing device can have a reflective mirror at the inner side thereof for light reflection. Please refer to FIG. 2, which shows the reflective mirror 131 at the inner side of the image providing device 13 according to the 1st embodiment of the present disclosure.

When the image providing device includes a digital micromirror device, the image providing device can have a light reducing surface at the inner side thereof, and the light reducing surface can have an anti-reflection subwavelength structure. By disposing the anti-reflection subwavelength structure, it is favorable for increasing the effect of the light reducing surface inside the digital micromirror device, thereby reducing the influence of light reflection inside the light engine on the projected image. Please refer to FIG. 3, which shows the light reducing surface 132 and the anti-reflection subwavelength structure 133 at the inner side of the image providing device 13 according to the 1st embodiment of the present disclosure.

The image providing device can include a light reducing layer with an anti-reflection subwavelength structure at the outer side thereof. Therefore, it is favorable for reducing the generation of stray light with a large field of view inside the light engine. Note that the anti-reflection subwavelength structure provided by the image providing device at the outer side thereof is not limited to the type of the image providing device. Please refer to FIG. 4, FIG. 6, and FIG. 8, which respectively show the anti-reflection subwavelength structure 233 of the image providing device 23 including a display with liquid crystal on silicon, the anti-reflection subwavelength structure 433 of the image providing device 43 including a digital micromirror device, and the anti-reflection subwavelength structure 633 of the image providing device 63 including a liquid-crystal display according to the 2nd, 4th, and 6th embodiments of the present disclosure.

There can be a heat dissipation layer disposed on at least one of the front surface and the rear surface of the image providing device. Specifically, the image providing device can be coated with a heat dissipation layer on at least one of the front surface and the rear surface thereof. Therefore, it is favorable for increasing heat dissipation effect and preventing poor refresh rate due to overheated image providing device. Please refer to FIG. 5, which shows two heat dissipation layers HDM disposed on the front surface and the rear surface of the image providing device 33 according to the 3rd embodiment of the present disclosure. Please refer to FIG. 6, which shows the heat dissipation layer HDM disposed on the front surface of the image providing device 43 according to the 4th embodiment of the present disclosure.

The heat dissipation layer can include a diamond-like-carbon (DLC) coating. Alternatively, the heat dissipation layer can include a graphene coating. Please refer to FIG. 5, which shows the heat dissipation layer HDM that can include a diamond-like-carbon coating or a graphene coating according to the 3rd embodiment of the present disclosure.

When a thickness of the heat dissipation layer is Td, the following condition can be satisfied: $0.5\ \mu m < Td < 5.0\ \mu m$. Therefore, it is favorable for achieving good heat dissipation effect. Moreover, the following condition can also be satisfied: $3.5\ \mu m < Td < 4.0\ \mu m$. Therefore, it is favorable for achieving better heat dissipation effect. Please refer to FIG. 5, which shows Td according to the 3rd embodiment of the present disclosure.

The projected light surface can also be disposed with a heat dissipation layer. Therefore, it is favorable for increasing overall heat dissipation effect. Please refer to FIG. 6, which shows the heat dissipation layer HDM disposed adjacent to the light sources 411, 412, and 413 according to the 4th embodiment of the present disclosure.

According to the present disclosure, the light engine can further include a diffuser layer that can be located between the projected light surface and the image surface. By configuring the diffuser layer, it is favorable for uniformly distributing the projection light. Please refer to FIG. 1, which shows the diffuser layer 16 according to the 1st embodiment of the present disclosure.

According to the present disclosure, the light engine can further include a collimator layer that can be located between the projected light surface and the image surface. By configuring the collimator layer, it is favorable for preventing light crosstalk. Please refer to FIG. 4, which shows the collimator layer 27 according to the 2nd embodiment of the present disclosure.

The present disclosure also provides a projection device that includes a circuit board, the abovementioned light engine, a casing, and a heat dissipation device. The light engine is disposed on the circuit board. The casing encloses the circuit board and the light engine. The heat dissipation device is connected to the casing. By doing so, it is favorable for reducing the size of the projection device.

There can be a heat dissipation layer disposed on at least one of a front surface and a rear surface of the circuit board. Therefore, it is favorable for increasing heat dissipation effect of the projection device. Please refer to FIG. 6, which shows the heat dissipation layer HDM disposed on the rear surface of the circuit board 4a according to the 4th embodiment of the present disclosure. Note that the front surface of the circuit board refers to a side of the circuit board where the projected light surface is located, and the rear surface of the circuit board refers to the surface opposite to the front surface.

The heat dissipation layer can include a diamond-like-carbon coating. Alternatively, the heat dissipation layer can include a graphene coating. Therefore, it is favorable for increasing the heat dissipation effect of the projection device. When a thickness of the heat dissipation layer is Td, the following condition can be satisfied: $0.5\ \mu m < Td < 5.0\ \mu m$. Therefore, it is favorable for achieving better heat dissipation effect.

There can be a diamond-like-carbon coating disposed on at least one of an inner surface and an outer surface of the casing. Therefore, it is favorable for further increasing the heat dissipation effect of the projection device. Please refer to FIG. 12, which shows the heat dissipation layer HDM disposed at the inner surface of the casing 9b according to the 9th embodiment of the present disclosure.

The heat dissipation device can be disposed perpendicular to the projected light surface, and the output flow direction thereof is in parallel with the projected light surface. Alternatively, the heat dissipation device can also be disposed perpendicular to the image surface, and the output flow direction thereof is in parallel with the image surface. Therefore, it is favorable for taking heat away from the projected light surface or the image surface through heat convection.

According to the present disclosure, the projection device can further include a time-of-flight sensing unit that is disposed at an opening of the casing. Therefore, it is favorable for focusing and correcting the image on the image surface of the projection device. Please refer to FIG. 11 and FIG. 12, which show the time-of-flight sensing unit 9d disposed at the opening of the casing 9b according to the 9th embodiment of the present disclosure.

According to the present disclosure, the aforementioned features and conditions can be utilized in numerous combinations so as to achieve corresponding effect.

According to the above description of the present disclosure, the following specific embodiments are provided for further explanation.

1st Embodiment

Please refer to FIG. 1, which is a schematic view of a light engine according to the 1st embodiment of the present disclosure.

In this embodiment, a light engine 10 includes a substrate BS, a projected light surface 11, an image surface 12, an image providing device 13, a plurality of folding elements 14, a projection lens assembly 15, and a diffuser layer 16.

The projected light surface 11 is located at a side of the substrate BS, and the projected light surface 11 includes a first light source 111, a second light source 112, and a third light source 113. Each of the first light source 111, the second light source 112, and the third light source 113 is a VCSEL or a light emitting diode, and the three light sources 111, 112, and 113 emit light with different wavelengths such as blue light, green light, and red light.

The image surface 12 is spaced apart from the projected light surface 11. In other words, there is an air gap (not numbered) located between the image surface 12 and the projected light surface 11. The image surface 12 includes a first image area 121, a second image area 122, and a third image area 123.

Figure 2:
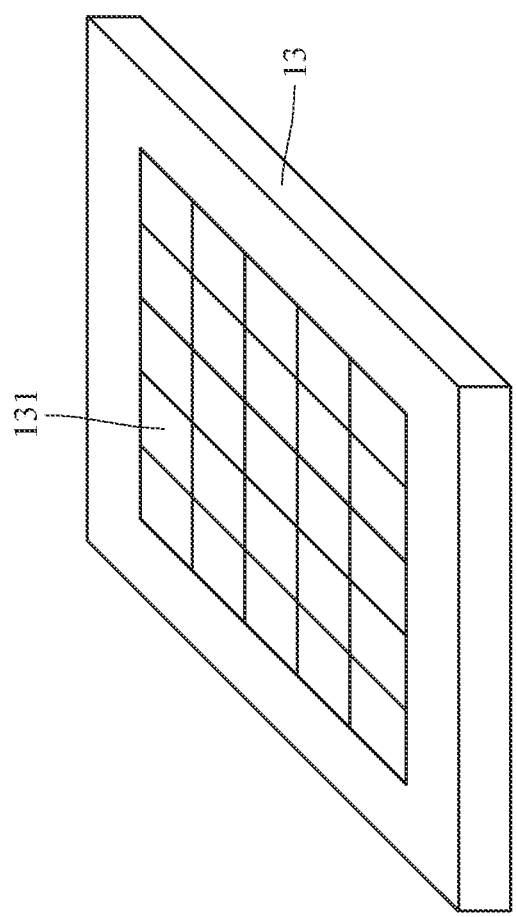
FIG. 2 is a perspective view of an image providing device of the light engine in FIG. 1.
Figure 3:
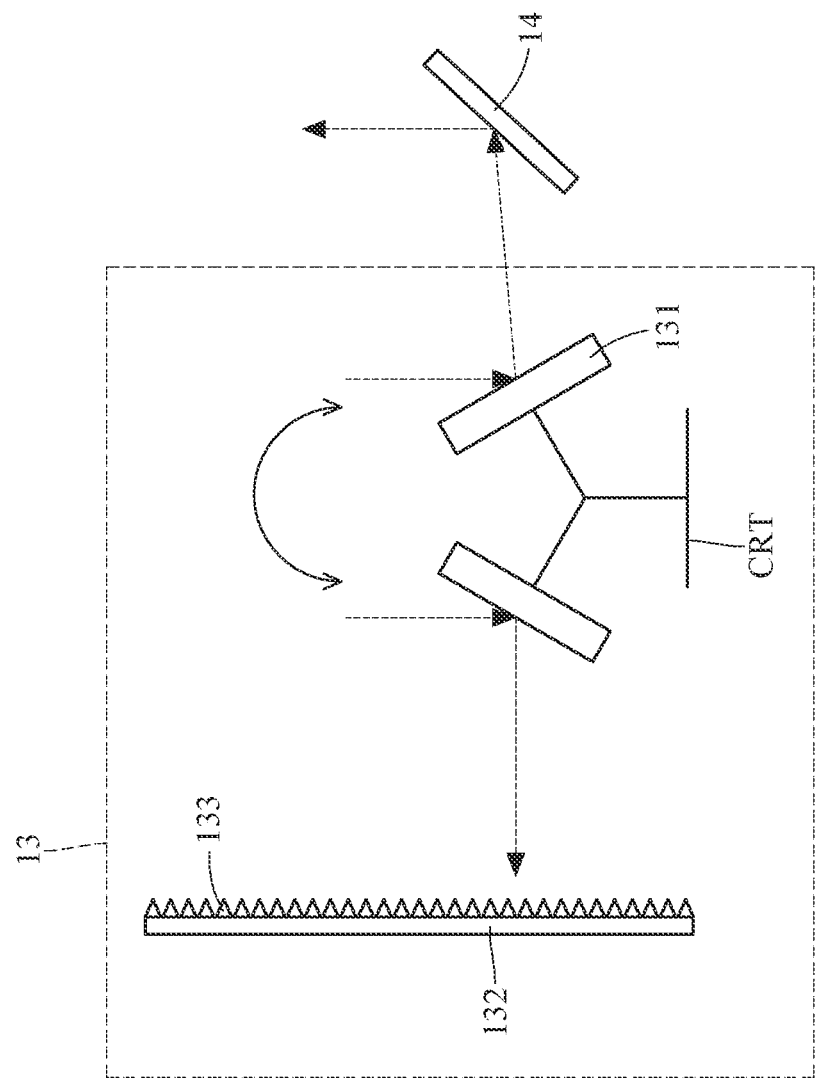
FIG. 3 is a schematic view showing the process of a reflective mirror of the image providing device in FIG. 2.

The image providing device 13 includes a digital micromirror device. The image providing device 13 has a front surface and a rear surface, and the image surface 12 is located on the front surface of the image providing device 13. In this embodiment, the image providing device 13 corresponds to the three image areas 121, 122, and 123. Please refer to FIG. 2 and FIG. 3, where FIG. 2 is a perspective view of an image providing device of the light engine in FIG. 1, and FIG. 3 is a schematic view showing the process of a reflective mirror of the image providing device in FIG. 2. As shown in FIG. 2, the image providing device 13 including a digital micromirror device has a reflective mirror 131 at the inner side thereof. The image providing device 13 is able to image incident light and then to reflect the imaged light through the reflective mirror 131. Specifically, as shown in FIG. 3, the image providing device 13 including a digital micromirror device has a light reducing surface 132 at the inner side thereof, and the light reducing surface 132 has an anti-reflection subwavelength structure 133 so as to reduce the generation of stray light with a large field of view inside the light engine 10. And, the reflective mirror 131 is rotatable under the control of a circuit CRT. As such, the light rays emitting towards the reflective mirror 131 is selectively directed to the anti-reflection subwavelength structure 133 of the light reducing surface 132 so as to be not reflected outside the image providing device 13 or to be reflected towards the folding elements 14 which is located outside the image providing device 13. The image providing device 13 is able to output patterned imaging light by selectively reflecting incident light outside.

The plurality of folding elements 14 are disposed between the projected light surface 11 and the image surface 12 and include a first folding element 141, a second folding element 142, and a third folding element 143. The first folding element 141 is a beam splitter, the second folding element 142 is a reflective polarizing element, and the third folding element 143 is a beam splitter. The first folding element 141, the second folding element 142, and the third folding element 143 are arranged along a light emitting axis LEA.

The projection lens assembly 15 and the light emitting axis LEA are disposed on the same optical path, and the projected light surface 11 and the image surface 12 are substantially in parallel with the light emitting axis LEA. Also, the diffuser layer 16 is located between the projected light surface 11 and the image surface 12.

The first light source 111 corresponds to the first image area 121 and the first folding element 141, the second light source 112 corresponds to the second image area 122 and the second folding element 142, and the third light source 113 corresponds to the third image area 123 and the third folding element 143. Specifically, the first light source 111, the second light source 112, and the third light source 113 located at a side of the substrate BS respectively emit light rays of blue, green, and red colors. These light rays pass through the diffuser layer 16 and then respectively emit towards the first image area 121, the second image area 122, and the third image area 123 via the first folding element 141, the second folding element 142, the third folding element 143 so as to be changed into patterned imaging light of three primary colors. The blue imaging light is reflected by the reflective mirror 131 of the image providing device 13 and is directed towards the second folding element 142 along the light emitting axis LEA by the first folding element 141. Similarly, the green imaging light is reflected by the reflective mirror 131 to be combined with the blue imaging light at the second folding element 142 and is directed towards the third folding element 143 along the light emitting axis LEA by the second folding element 142. Similarly, the red imaging light is reflected by the reflective mirror 131 and is directed by the third folding element 143 to be combined with the combination of blue and green imaging light. The combined imaging light of three primary light emits along the light emitting axis LEA so as to be focused by the projection lens assembly 15 to form a projection onto an object (e.g., a projection surface).

2nd Embodiment

Figure 4:
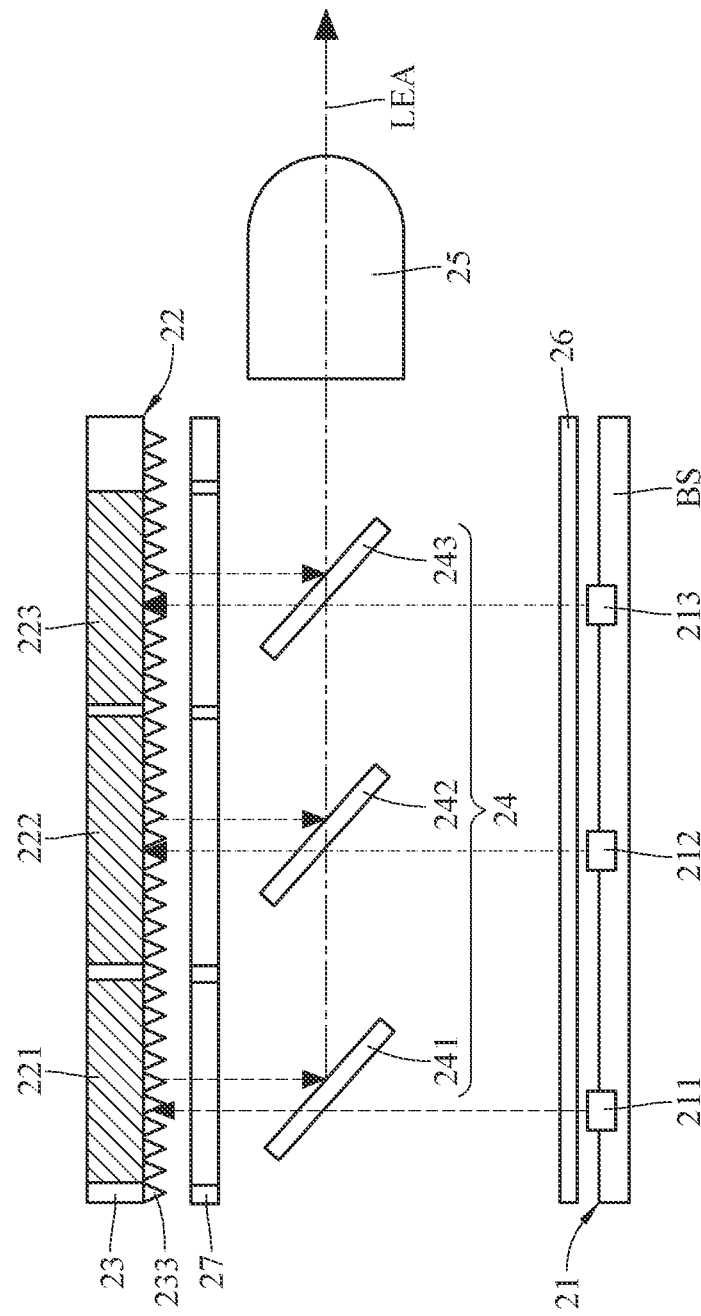
FIG. 4 is a schematic view of a light engine according to the 2nd embodiment of the present disclosure.

Please refer to FIG. 4, which is a schematic view of a light engine according to the 2nd embodiment of the present disclosure.

In this embodiment, a light engine 20 includes a substrate BS, a projected light surface 21, an image surface 22, an image providing device 23, a plurality of folding elements 24, a projection lens assembly 25, a diffuser layer 26, and a collimator layer 27.

The projected light surface 21 is located at a side of the substrate BS, and the projected light surface 21 includes a first light source 211, a second light source 212, and a third light source 213. The first light source 211, the second light source 212, and the third light source 213 emit light with different wavelengths such as blue light, green light, and red light.

The image surface 22 is spaced apart from the projected light surface 21. In other words, there is an air gap (not numbered) located between the image surface 22 and the projected light surface 21. The image surface 22 includes a first image area 221, a second image area 222, and a third image area 223.

The image providing device 23 includes a display with liquid crystal on silicon. The image providing device 23 has a front surface and a rear surface, and the image surface 22 is located on the front surface of the image providing device 23. In this embodiment, the image providing device 23 corresponds to the three image areas 221, 222, and 223. The image providing device 23 including a display with liquid crystal on silicon is able to output patterned imaging light through the reflection of a mirror layer thereof. And, the image providing device 23 includes a light reducing layer (not shown) with an anti-reflection subwavelength structure 233 at the outer side thereof so as to reduce the generation of stray light with a large field of view inside the light engine 20.

The plurality of folding elements 24 are disposed between the projected light surface 21 and the image surface 22 and include a first folding element 241, a second folding element 242, and a third folding element 243. The first folding element 241, the second folding element 242, and the third folding element 243 are arranged along a light emitting axis LEA.

The projection lens assembly 25 and the light emitting axis LEA are disposed on the same optical path, and the projected light surface 21 and the image surface 22 are substantially in parallel with the light emitting axis LEA. Also, the diffuser layer 26 and the collimator layer 27 are located between the projected light surface 21 and the image surface 22.

The first light source 211 corresponds to the first image area 221 and the first folding element 241, the second light source 212 corresponds to the second image area 222 and the second folding element 242, and the third light source 213 corresponds to the third image area 223 and the third folding element 243. Specifically, the first light source 211, the second light source 212, and the third light source 213 located at a side of the substrate BS respectively emit light rays of blue, green, and red colors. These light rays pass through the diffuser layer 26, the collimator layer 27, and the anti-reflection subwavelength structure 233 and then respectively emit towards the first image area 221, the second image area 222, and the third image area 223 so as to be changed into patterned imaging light of three primary colors by the image providing device 23. The blue imaging light is reflected off the image providing device 23 to pass through the collimator layer 27 again and is directed towards the second folding element 242 along the light emitting axis LEA by the first folding element 241. Similarly, the green imaging light is reflected off the image providing device 23 to pass through the collimator layer 27 again and is directed by the second folding element 242 to be combined with the blue imaging light so as to emit towards the third folding element 243 along the light emitting axis LEA. Similarly, the red imaging light is reflected off the image providing device 23 to pass through the collimator layer 27 again and is reflected by the third folding element 243 to be combined with the combination of blue and green imaging light.

The combined imaging light of three primary light emits along the light emitting axis LEA so as to be focused by the projection lens assembly 25 to form a projection onto an object.

3rd Embodiment

Figure 5:
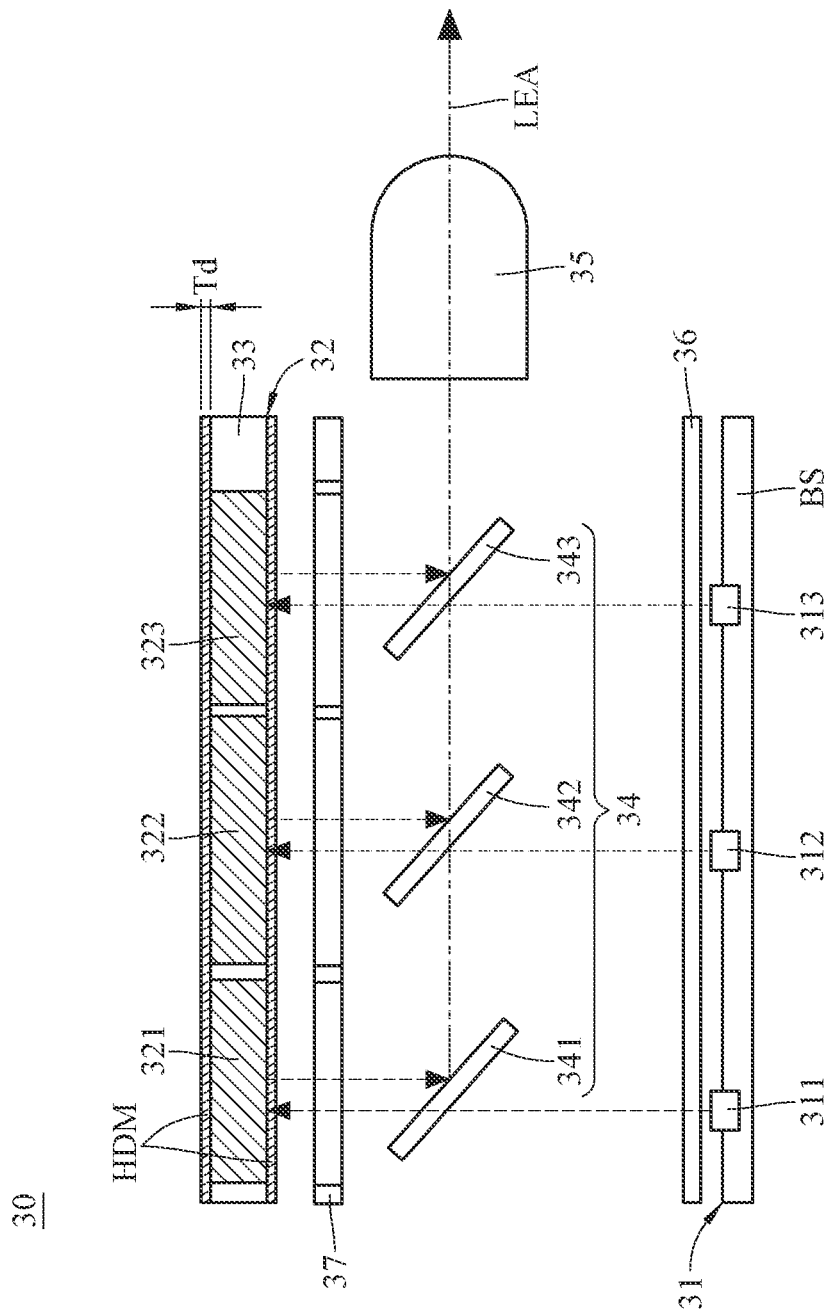
FIG. 5 is a schematic view of a light engine according to the 3rd embodiment of the present disclosure.

Please refer to FIG. 5, which is a schematic view of a light engine according to the 3rd embodiment of the present disclosure.

In this embodiment, a light engine 30 includes a substrate BS, a projected light surface 31, an image surface 32, an image providing device 33, a plurality of folding elements 34, a projection lens assembly 35, a diffuser layer 36, and a collimator layer 37.

The projected light surface 31 is located at a side of the substrate BS, and the projected light surface 31 includes a first light source 311, a second light source 312, and a third light source 313. The first light source 311, the second light source 312, and the third light source 313 emit light with different wavelengths such as blue light, green light, and red light.

The image surface 32 is spaced apart from the projected light surface 31. In other words, there is an air gap (not numbered) located between the image surface 32 and the projected light surface 31. The image surface 32 includes a first image area 321, a second image area 322, and a third image area 323.

The image providing device 33 includes a digital micromirror device or a display with liquid crystal on silicon. The image providing device 33 has a front surface and a rear surface, and the image surface 32 is located on the front surface of the image providing device 33. In this embodiment, the image providing device 33 corresponds to the three image areas 321, 322, and 323. The image providing device 33 is coated with heat dissipation layers HDM including a diamond-like-carbon coating or a graphene coating on the front surface and the rear surface thereof. When a thickness of one of the heat dissipation layers HDM is Td, the following condition is satisfied: $0.5\ \mu m < Td < 5.0\ \mu m$. Specifically, the following condition is satisfied: $Td = 0.9\ \mu m$; $2.3\ \mu m$; or $3.7\ \mu m$.

Furthermore, when the thickness of the heat dissipation layer HDM is 0 μm (i.e., without a heat dissipation layer); 0.9 μm; 2.3 μm; or 3.7 μm, HRC50 (heat resistance co-efficient @ 50 Walts) is respectively 31, 24, 23, or 16. That is, disposing a heat dissipation layer of 3.7 μm is able to generate almost 50% heat resistance difference from disposing no heat dissipation layer [(31−16)/31=48%]. Therefore, by disposing a heat dissipation layer, it is favorable for effectively improving heat conduction effect.

The plurality of folding elements 34 are disposed between the projected light surface 31 and the image surface 32 and include a first folding element 341, a second folding element 342, and a third folding element 343. The first folding element 341, the second folding element 342, and the third folding element 343 are arranged along a light emitting axis LEA.

The projection lens assembly 35 and the light emitting axis LEA are disposed on the same optical path, and the projected light surface 31 and the image surface 32 are substantially in parallel with the light emitting axis LEA. Also, the diffuser layer 36 and the collimator layer 37 are located between the projected light surface 31 and the image surface 32.

The first light source 311 corresponds to the first image area 321 and the first folding element 341, the second light source 312 corresponds to the second image area 322 and the second folding element 342, and the third light source 313 corresponds to the third image area 323 and the third folding element 343.

Specifically, the first light source 311, the second light source 312, and the third light source 313 located at a side of the substrate BS respectively emit light rays of blue, green, and red colors. These light rays pass through the diffuser layer 36, the collimator layer 37, and one of the heat dissipation layers HDM and then respectively emit towards the first image area 321, the second image area 322, and the third image area 323 so as to be changed into patterned imaging light of three primary colors by the image providing device 33. The blue imaging light is reflected off the image providing device 33 to pass through the collimator layer 37 again and is directed towards the second folding element 342 along the light emitting axis LEA by the first folding element 341. Similarly, the green imaging light is reflected off the image providing device 33 to pass through the collimator layer 37 again and is directed by the second folding element 342 to be combined with the blue imaging light so as to emit towards the third folding element 343 along the light emitting axis LEA. Similarly, the red imaging light is reflected off the image providing device 33 to pass through the collimator layer 37 again and is reflected by the third folding element 343 to be combined with the combination of blue and green imaging light. The combined imaging light of three primary light emits along the light emitting axis LEA so as to be focused by the projection lens assembly 35 to form a projection onto an object.

4th Embodiment

Figure 6:
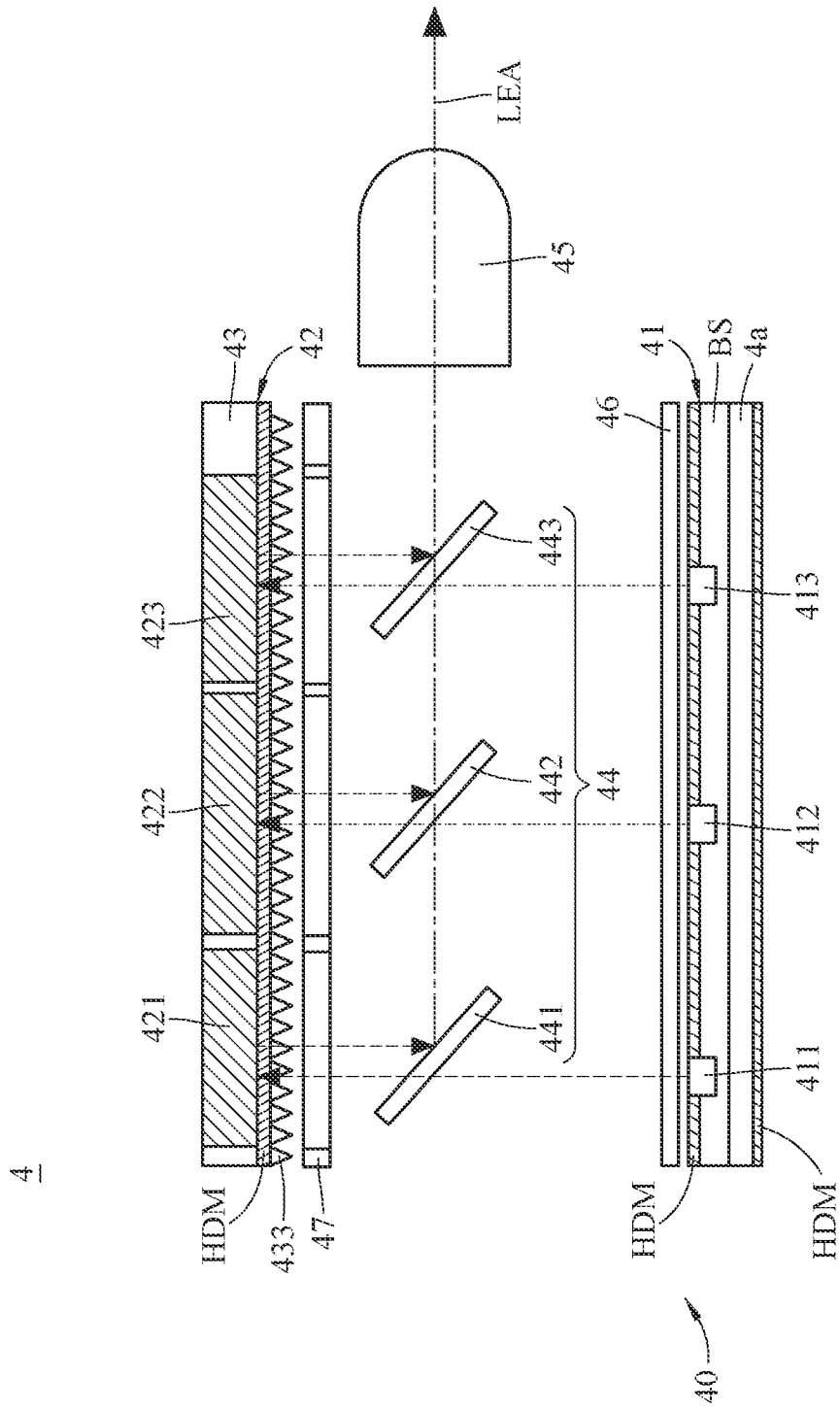
FIG. 6 is a schematic view of a projection device according to the 4th embodiment of the present disclosure.

Please refer to FIG. 6, which is a schematic view of a projection device according to the 4th embodiment of the present disclosure.

In this embodiment, a projection device 4 includes a circuit board 4a, a light engine 40, and other components (not shown) such as a casing and a heat dissipation device. The light engine 40 is disposed on the circuit board 4a. The other components are directly or indirectly coupled to the circuit board 4a and the light engine 40.

The light engine 40 includes a substrate BS, a projected light surface 41, an image surface 42, an image providing device 43, a plurality of folding elements 44, a projection lens assembly 45, a diffuser layer 46, and a collimator layer 47.

The substrate BS is located on the front surface of the circuit board 4a. And, the circuit board 4a is coated with a heat dissipation layer HDM including a diamond-like-carbon coating or a graphene coating on the rear surface thereof.

The projected light surface 41 is located at a side of the substrate BS away from the circuit board 4a, and the projected light surface 41 includes a first light source 411, a second light source 412, and a third light source 413. The first light source 411, the second light source 412, and the third light source 413 emit light with different wavelengths such as blue light, green light, and red light. Also, the light sources 411, 412, and 413 are coated with a heat dissipation layer HDM including a diamond-like-carbon coating or a graphene coating.

The image surface 42 is spaced apart from the projected light surface 41. In other words, there is an air gap (not numbered) located between the image surface 42 and the projected light surface 41. The image surface 42 includes a first image area 421, a second image area 422, and a third image area 423.

The image providing device 43 includes a digital micromirror device. The image providing device 43 has a front surface and a rear surface, and the image surface 42 is located on the front surface of the image providing device 43. In this embodiment, the image providing device 43 corresponds to the three image areas 421, 422, and 423. The image providing device 43 includes a light reducing layer (not shown) with an anti-reflection subwavelength structure 433 at the outer side thereof so as to reduce the generation of stray light with a large field of view inside the light engine 40. And, the image providing device 43 is coated with a heat dissipation layer HDM including a diamond-like-carbon coating or a graphene coating on the front surface thereof. When a thickness of the heat dissipation layer HDM is Td, the following condition is satisfied: 0.5 µm<Td<5.0 µm. Specifically, the following condition is satisfied: Td=0.9 µm; 2.3 µm; or 3.7 µm.

The plurality of folding elements 44 are disposed between the projected light surface 41 and the image surface 42 and include a first folding element 441, a second folding element 442, and a third folding element 443. The first folding element 441, the second folding element 442, and the third folding element 443 are arranged along a light emitting axis LEA.

The projection lens assembly 45 and the light emitting axis LEA are disposed on the same optical path, and the projected light surface 41 and the image surface 42 are substantially in parallel with the light emitting axis LEA. Also, the diffuser layer 46 and the collimator layer 47 are located between the projected light surface 41 and the image surface 42.

The first light source 411 corresponds to the first image area 421 and the first folding element 441, the second light source 412 corresponds to the second image area 422 and the second folding element 442, and the third light source 413 corresponds to the third image area 423 and the third folding element 443. Specifically, the first light source 411, the second light source 412, and the third light source 413 located at a side of the substrate BS respectively emit light rays of blue, green, and red colors. These light rays pass through the diffuser layer 46, the collimator layer 47, the anti-reflection subwavelength structure 433, and one of the heat dissipation layers HDM and then respectively emit towards the first image area 421, the second image area 422, and the third image area 423 so as to be changed into patterned imaging light of three primary colors by the image providing device 43. The blue imaging light is reflected off the image providing device 43 to pass through the collimator layer 47 again and is directed towards the second folding element 442 along the light emitting axis LEA by the first folding element 441. Similarly, the green imaging light is reflected off the image providing device 43 to pass through the collimator layer 47 again and is directed by the second folding element 442 to be combined with the blue imaging light so as to emit towards the third folding element 443 along the light emitting axis LEA. Similarly, the red imaging light is reflected off the image providing device 43 to pass through the collimator layer 47 again and is reflected by the third folding element 443 to be combined with the combination of blue and green imaging light. The combined imaging light of three primary light emits along the light emitting axis LEA so as to be focused by the projection lens assembly 45 to form a projection onto an object.

5th Embodiment

Figure 7:
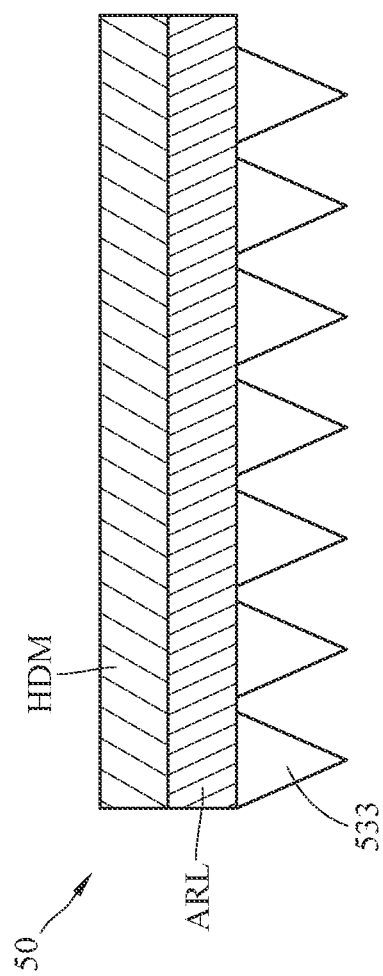
FIG. 7 is a partial and schematic view of a light engine according to the 5th embodiment of the present disclosure.

In the previous embodiment, the anti-reflection subwavelength structure 433 is directly disposed on the heat dissipation layer HDM, but the present disclosure is not limited thereto. Please refer to FIG. 7, which is a partial and schematic view of a light engine according to the 5th embodiment of the present disclosure. Note that only difference between this and the abovementioned embodiments will be illustrated.

In this embodiment, the anti-reflection subwavelength structure 533 is indirectly connected to the heat dissipation layer HDM via an anti-reflection layer ARL. By disposing the anti-reflection subwavelength structure 533 and the anti-reflection layer ARL, it is favorable for further reducing the generation of stray light with a large field of view inside the light engine 50.

6th Embodiment

Figure 8:
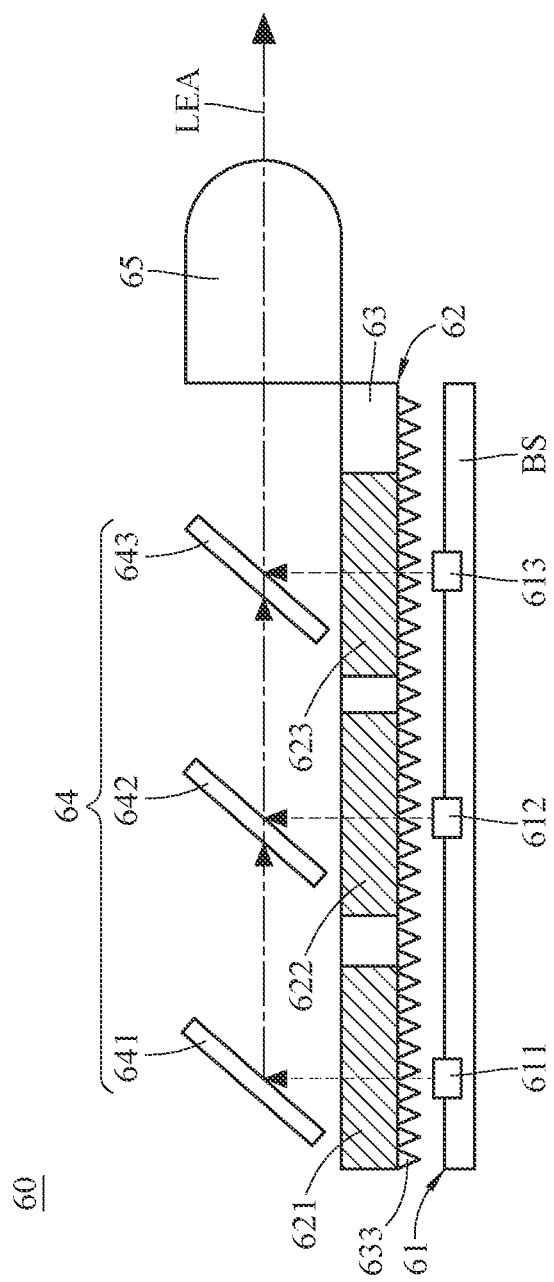
FIG. 8 is a schematic view of a light engine according to the 6th embodiment of the present disclosure.

Please refer to FIG. 8, which is a schematic view of a light engine according to the 6th embodiment of the present disclosure.

In this embodiment, a light engine 60 includes a substrate BS, a projected light surface 61, an image surface 62, an image providing device 63, a plurality of folding elements 64, and a projection lens assembly 65.

The projected light surface 61 is located at a side of the substrate BS, and the projected light surface 61 includes a first light source 611, a second light source 612, and a third light source 613. The first light source 611, the second light source 612, and the third light source 613 emit light with different wavelengths such as blue light, green light, and red light.

The image surface 62 is spaced apart from the projected light surface 61. In other words, there is an air gap (not numbered) located between the image surface 62 and the projected light surface 61. The image surface 62 includes a first image area 621, a second image area 622, and a third image area 623.

The image providing device 63 includes a liquid-crystal display. The image providing device 63 has a front surface and a rear surface, and the image surface 62 is located on the front surface of the image providing device 63. In this embodiment, the image providing device 63 corresponds to the three image areas 621, 622, and 623. The image providing device 63 includes a light reducing layer (not shown) with an anti-reflection subwavelength structure 633 at the outer side thereof so as to reduce the generation of stray light with a large field of view inside the light engine 60.

The plurality of folding elements 64 include a first folding element 641, a second folding element 642, and a third folding element 643. The first folding element 641 is a reflective mirror, the second folding element 642 is a dichroic mirror, and the third folding element 643 is a dichroic mirror. The first folding element 641, the second folding element 642, and the third folding element 643 are arranged along a light emitting axis LEA. And, the image surface 62 is disposed between the projected light surface 61 and the plurality of folding elements 64.

The projection lens assembly 65 and the light emitting axis LEA are disposed on the same optical path, and the projected light surface 61 and the image surface 62 are substantially in parallel with the light emitting axis LEA.

The first light source 611 corresponds to the first image area 621 and the first folding element 641, the second light source 612 corresponds to the second image area 622 and the second folding element 642, and the third light source 613 corresponds to the third image area 623 and the third folding element 643. Specifically, the first light source 611, the second light source 612, and the third light source 613 located at a side of the substrate BS respectively emit light rays of blue, green, and red colors. These light rays pass through the anti-reflection subwavelength structure 633 and then respectively emit towards the first image area 621, the second image area 622, and the third image area 623 so as to be changed into patterned imaging light of three primary colors by the image providing device 63. The blue imaging light, the green imaging light, and the red imaging light pass through the image providing device 63 and then are respectively directed by the first folding element 641, the second folding element 642, and the third folding element 643 to emit along the light emitting axis LEA so as to be focused by the projection lens assembly 65 to form a projection onto an object.

7th Embodiment

Figure 9:
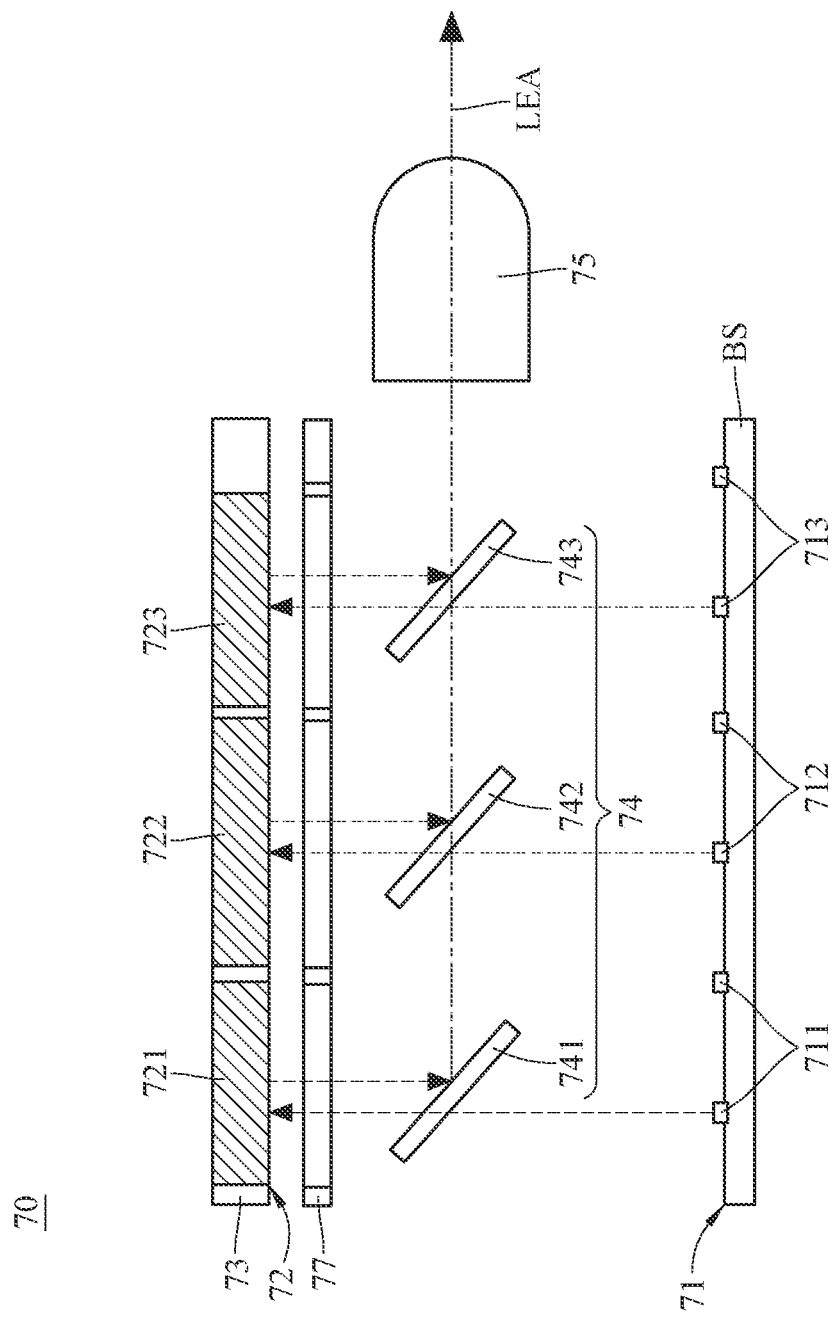
FIG. 9 is a schematic view of a light engine according to the 7th embodiment of the present disclosure.

Please refer to FIG. 9, which is a schematic view of a light engine according to the 7th embodiment of the present disclosure.

In this embodiment, a light engine 70 includes a substrate BS, a projected light surface 71, an image surface 72, an image providing device 73, a plurality of folding elements 74, a projection lens assembly 75, and a collimator layer 77.

The projected light surface 71 is located at a side of the substrate BS and can be a panel light source. The projected light surface 71 includes a group of first light sources 711, a group of second light sources 712, and a group of third light sources 713. Each of the first light sources 711, the second light sources 712, and the third light sources 713 includes mini-light-emitting diodes, micro light emitting diodes, or micro organic light emitting diodes, and the three light sources 711, 712, and 713 emit light with different wavelengths such as blue light, green light, and red light.

The image surface 72 is spaced apart from the projected light surface 71. In other words, there is an air gap (not numbered) located between the image surface 72 and the projected light surface 71. The image surface 72 includes a first image area 721, a second image area 722, and a third image area 723.

The image providing device 73 includes a digital micromirror device or a display with liquid crystal on silicon. The image providing device 73 has a front surface and a rear surface, and the image surface 72 is located on the front surface of the image providing device 73. In this embodiment, the image providing device 73 corresponds to the three image areas 721, 722, and 723.

The plurality of folding elements 74 are disposed between the projected light surface 71 and the image surface 72 and include a first folding element 741, a second folding element 742, and a third folding element 743. The first folding element 741, the second folding element 742, and the third folding element 743 are arranged along a light emitting axis LEA.

The projection lens assembly 75 and the light emitting axis LEA are disposed on the same optical path, and the projected light surface 71 and the image surface 72 are substantially in parallel with the light emitting axis LEA. Also, the collimator layer 77 is located between the projected light surface 71 and the image surface 72.

The first light sources 711 correspond to the first image area 721 and the first folding element 741, the second light sources 712 correspond to the second image area 722 and the second folding element 742, and the third light sources 713 correspond to the third image area 723 and the third folding element 743. Specifically, the first light sources 711, the second light sources 712, and the third light sources 713 located at a side of the substrate BS respectively emit light rays of blue, green, and red colors. These light rays pass through the collimator layer 77 and then respectively emit towards the first image area 721, the second image area 722, and the third image area 723 so as to be changed into patterned imaging light of three primary colors by the image providing device 73. The blue imaging light is reflected off the image providing device 73 to pass through the collimator layer 77 again and is directed towards the second folding element 742 along the light emitting axis LEA by the first folding element 741. Similarly, the green imaging light is reflected off the image providing device 73 to pass through the collimator layer 77 again and is directed by the second folding element 742 to be combined with the blue imaging light so as to emit towards the third folding element 743 along the light emitting axis LEA. Similarly, the red imaging light is reflected off the image providing device 73 to pass through the collimator layer 77 again and is reflected by the third folding element 743 to be combined with the combination of blue and green imaging light. The combined imaging light of three primary light emits along the light emitting axis LEA so as to be focused by the projection lens assembly 75 to form a projection onto an object.

8th Embodiment

Figure 10:
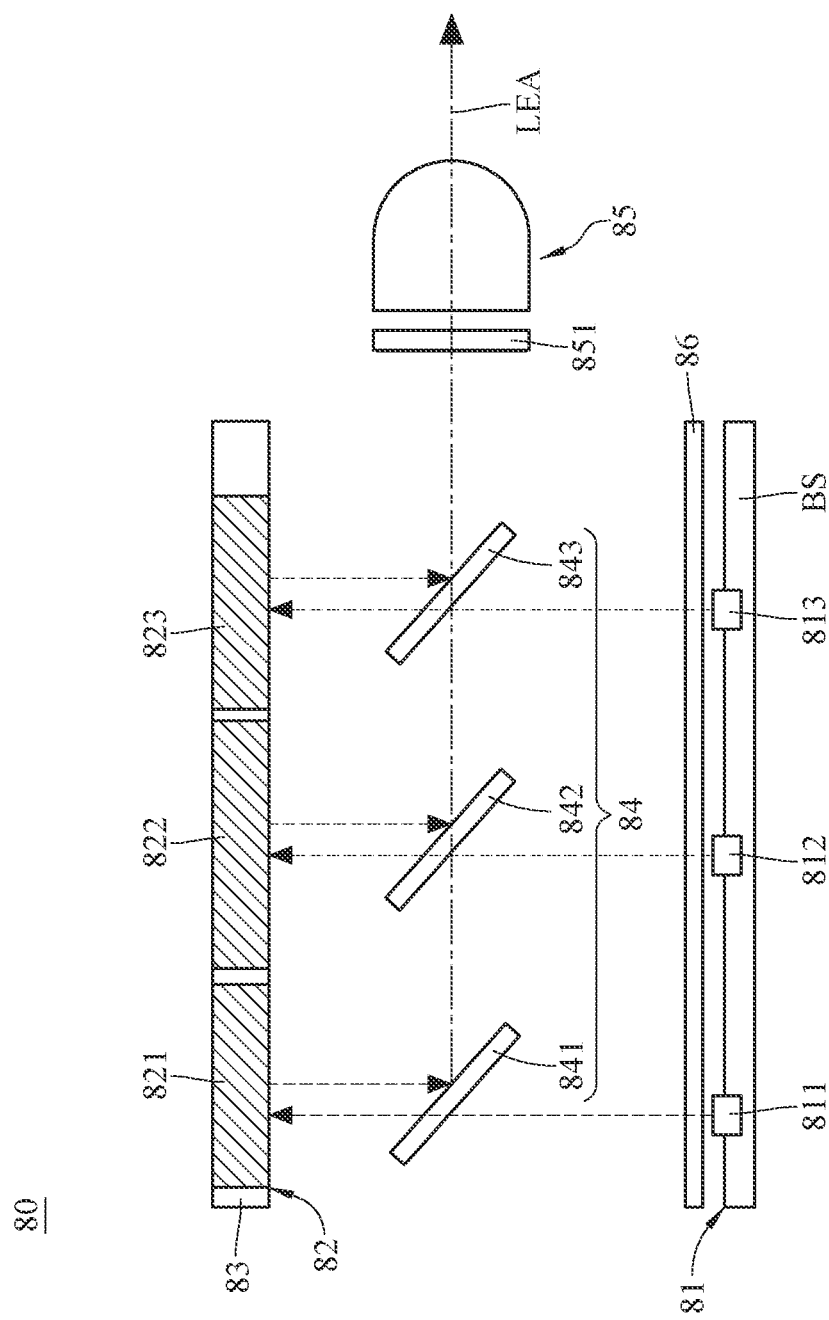
FIG. 10 is a schematic view of a light engine according to the 8th embodiment of the present disclosure.

Please refer to FIG. 10, which is a schematic view of a light engine according to the 8th embodiment of the present disclosure.

In this embodiment, a light engine 80 includes a substrate BS, a projected light surface 81, an image surface 82, an image providing device 83, a plurality of folding elements 84, a projection lens assembly 85, and a diffuser layer 86.

The projected light surface 81 is located at a side of the substrate BS, and the projected light surface 81 includes a first light source 811, a second light source 812, and a third light source 813. Each of the first light source 811, the second light source 812, and the third light source 813 is a VCSEL or a light emitting diode, and the three light sources 811, 812, and 813 emit light with different wavelengths such as blue light, green light, and red light.

The image surface 82 is spaced apart from the projected light surface 81. In other words, there is an air gap (not numbered) located between the image surface 82 and the projected light surface 81. The image surface 82 includes a first image area 821, a second image area 822, and a third image area 823.

The image providing device 83 includes a digital micromirror device or a display with liquid crystal on silicon. The image providing device 83 has a front surface and a rear surface, and the image surface 82 is located on the front surface of the image providing device 83. In this embodiment, the image providing device 83 corresponds to the three image areas 821, 822, and 823.

The plurality of folding elements 84 are disposed between the projected light surface 81 and the image surface 82 and include a first folding element 841, a second folding element 842, and a third folding element 843. The first folding element 841 is a beam splitter, the second folding element 842 is a reflective polarizing element, and the third folding element 843 is a beam splitter. The first folding element 841, the second folding element 842, and the third folding element 843 are arranged along a light emitting axis LEA.

The projection lens assembly 85 has a metalens 851, and the projection lens assembly 85 and the light emitting axis LEA are disposed on the same optical path. The projected light surface 81 and the image surface 82 are substantially in parallel with the light emitting axis LEA. Also, the diffuser layer 86 is located between the projected light surface 81 and the image surface 82.

The first light source 811 corresponds to the first image area 821 and the first folding element 841, the second light source 812 corresponds to the second image area 822 and the second folding element 842, and the third light source 813 corresponds to the third image area 823 and the third folding element 843. Specifically, the first light source 811, the second light source 812, and the third light source 813 located at a side of the substrate BS respectively emit light rays of blue, green, and red colors. These light rays pass through the diffuser layer 86 and then respectively emit towards the first image area 821, the second image area 822, and the third image area 823 via the first folding element 841, the second folding element 842, the third folding element 843 so as to be changed into patterned imaging light of three primary colors by the image providing device 83. The blue imaging light is reflected off the image providing device 83 and is directed towards the second folding element 842 along the light emitting axis LEA by the first folding element 841. Similarly, the green imaging light is reflected off the image providing device 83 and is directed by the second folding element 842 to be combined with the blue imaging light so as to emit towards the third folding element 843 along the light emitting axis LEA. Similarly, the red imaging light is reflected off the image providing device 83 and is reflected by the third folding element 843 to be combined with the combination of blue and green imaging light. The combined imaging light of three primary light emits along the light emitting axis LEA so as to be focused by the projection lens assembly 85 to form a projection onto an object.

9th Embodiment

Figure 11:
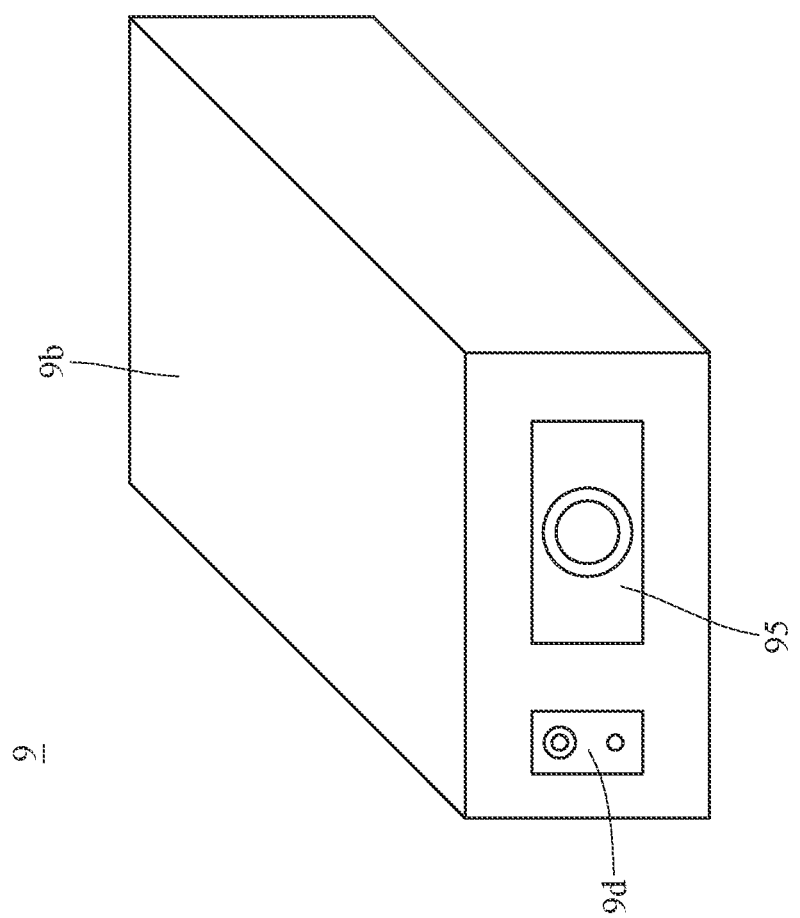
FIG. 11 is a schematic view of a projection device according to the 9th embodiment of the present disclosure.
Figure 12:
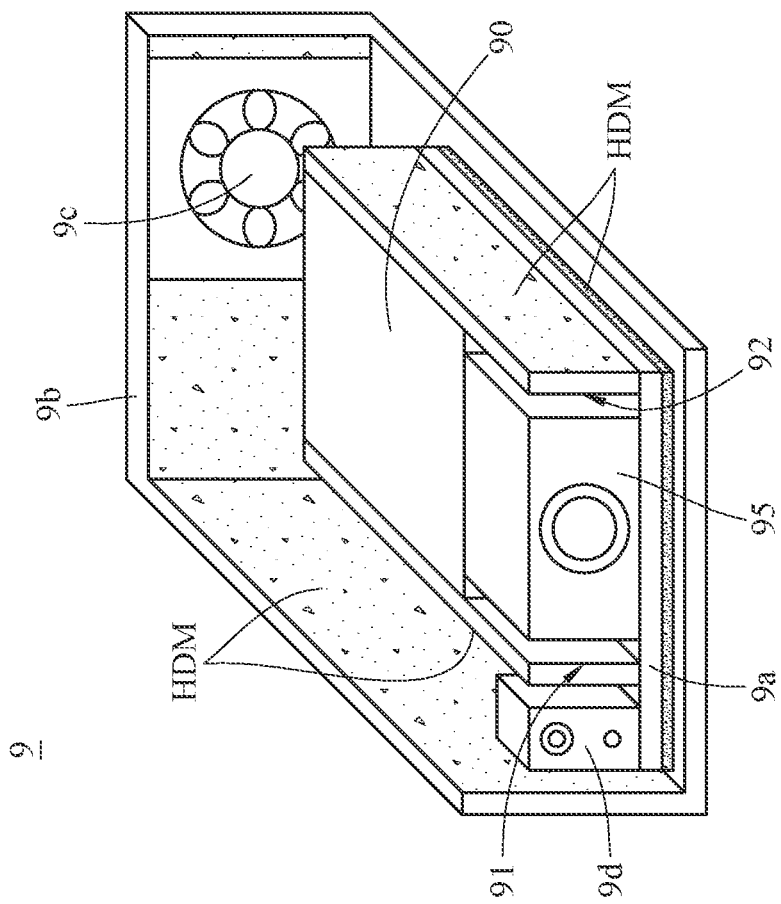
FIG. 12 is a schematic view showing the inner configuration of the projection device in FIG. 11.

Please refer to FIG. 11 and FIG. 12, where FIG. 11 is a schematic view of a projection device according to the 9th embodiment of the present disclosure, and FIG. 12 is a schematic view showing the inner configuration of the projection device in FIG. 11.

In this embodiment, a projection device 9 includes a circuit board 9a, a light engine 90, a casing 9b, a heat dissipation device 9c, a time-of-flight sensing unit 9d, a wireless connection device (not shown) and a speaker (not shown).

The light engine 90 may be the same as the light engine 10 disclosed in the 1st embodiment, but the present disclosure is not limited thereto. The light engine 90 may also be one of the light engines 20-80 disclosed in the other embodiments. The light engine 90 and the time-of-flight sensing unit 9d are disposed on the front surface of the circuit board 9a. The casing 9b encloses the circuit board 9a, the light engine 90, and the time-of-flight sensing unit 9d, and the casing 9b has an opening (not numbered) so as to expose the projection lens assembly 95 of the light engine 90 and the time-of-flight sensing unit 9d. The heat dissipation device 9c is connected to the casing 9b. The heat dissipation device 9c is disposed perpendicular to the projected light surface 91 and the image surface 92 of the light engine 90, and the output flow direction of the heat dissipation device 9c is in parallel with the projected light surface 91 and the image surface 92.

The circuit board 9a is coated with a heat dissipation layer HDM including a diamond-like-carbon coating or a graphene coating on the rear surface thereof. When a thickness of the heat dissipation layer HDM is Td, the following condition is satisfied: 0.5 μm<Td<5.0 μm. Also, each of the projected light surface 91 and the image surface 92 is coated with a heat dissipation layer HDM at a side located away from each other. Also, the casing 9b is coated with a heat dissipation layer HDM at an inner surface thereof.

The wireless connection device is in communication with external devices such as a smart phone, a tablet computer, a notebook computer, a desktop computer, a home video game console, or a handheld device (e.g., a remote controller, a joystick, or a game controller) via, for example, Bluetooth or wireless network so as to transmit an image to be projected to the projection device 9. In addition, the sound corresponding to the image to be projected can be played by the speaker of the projection device 9.

The projection device 9 receives the image to be projected from the wireless connection device, and then imaging light generated by the projection device 9 corresponding to the image to be projected is focused by the projection lens assembly 95 of the light engine 90 onto an object (e.g., a projection surface), while using the time-of-flight sensing unit 9d to assist in image focusing and correction. And, the projection device 9 uses the heat dissipation layers HDM disposed on the circuit board 9a, the projected light surface 91, the image surface 92, and the casing 9b and the heat dissipation device 9c disposed on the casing 9b to dissipate heat generated during the operation of the light engine 90 through heat conduction and convection.

According to the light engine and projection device discussed above, by disposing the three light sources on the same surface, disposing the three image areas on the same surface, and disposing the plurality of folding elements at the same optical axis, it is favorable for effectively miniaturizing the projection device, preventing blurred image generated during combination of light rays, and reducing difficulty in manufacturing and assembling the projection device.

Moreover, by disposing all light sources on the same surface and disposing all image areas on the same surface, it is favorable for providing a coating layer with good heat dissipation effect on these surfaces so as to effectively increase heat dissipation ability of the projection device, thereby preventing restricting power of the light sources due to poor heat dissipation caused by the miniaturization of the projection device.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A light engine, comprising:
an image surface, comprising a first image area, a second image area, and a third image area;
a projected light surface, comprising a first light source, a second light source, and a third light source, wherein the first light source, the second light source, and the third light source provide light with different wavelengths;
a projection lens assembly; and
a plurality of folding elements, disposed between the image surface and the projected light surface, wherein the plurality of folding elements comprise a first folding element, a second folding element, and a third folding element that are arranged along a light emitting axis;
wherein the image surface and the projected light surface are substantially in parallel with the light emitting axis, and there is an air gap located between the image surface and the projected light surface;
wherein the first light source corresponds to the first folding element and the first image area, the second light source corresponds to the second folding element and the second image area, and the third light source corresponds to the third folding element and the third image area; the light emitting axis and the projection lens assembly are disposed on a same optical path.

2. The light engine according to claim 1, further comprising an image providing device, wherein the image providing device has a front surface and a rear surface, the image surface is located on the front surface of the image providing device, and the image providing device comprises a digital micromirror device.

3. The light engine according to claim 2, wherein the image providing device has a light reducing surface, and the light reducing surface has an anti-reflection subwavelength structure.

4. The light engine according to claim 1, further comprising an image providing device, wherein the image providing device has a front surface and a rear surface, the image surface is located on the front surface of the image providing device, and the image providing device comprises a display with liquid crystal on silicon.

5. The light engine according to claim 4, wherein the image providing device comprises a light reducing layer with an anti-reflection subwavelength structure.

6. The light engine according to claim 1, wherein at least one of the plurality of folding elements is a reflective polarizing element.

7. The light engine according to claim 1, wherein at least one of the first light source, the second light source, and the third light source is a laser light source.

8. The light engine according to claim 7, wherein the laser light source is a vertical-cavity surface-emitting laser.

9. The light engine according to claim 1, wherein at least one of the first light source, the second light source, and the third light source comprises mini-light-emitting diodes.

10. The light engine according to claim 1, wherein at least one of the first light source, the second light source, and the third light source comprises micro light emitting diodes.

11. The light engine according to claim 1, further comprising an image providing device, wherein the image providing device has a front surface and a rear surface, the image surface is located on the front surface of the image providing device, and there is a heat dissipation layer disposed on at least one of the front surface and the rear surface of the image providing device.

12. The light engine according to claim 11, wherein the heat dissipation layer comprises a diamond-like-carbon coating, a thickness of the heat dissipation layer is Td, and the following condition is satisfied: 0.5 μm<Td<5.0 μm.

13. The light engine according to claim 12, wherein the thickness of the heat dissipation layer is Td, and the following condition is satisfied: 3.5 μm<Td<4.0 μm.

14. The light engine according to claim 1, wherein the projection lens assembly has at least one metalens.

15. The light engine according to claim 1, further comprising a collimator layer, wherein the collimator layer is located between the image surface and the projected light surface.

16. A projection device, comprising:
a circuit board;
a light engine, disposed on the circuit board, and the light engine comprising:
an image surface, comprising a first image area, a second image area, and a third image area;
a projected light surface, comprising a first light source, a second light source, and a third light source, wherein the first light source, the second light source, and the third light source provide light with different wavelengths;
a projection lens assembly; and
a plurality of folding elements, disposed between the image surface and the projected light surface, wherein the plurality of folding elements comprise a first folding element, a second folding element, and a third folding element that are arranged along a light emitting axis;
a casing, enclosing the circuit board and the light engine; and
a heat dissipation device, connected to the casing;
wherein the image surface and the projected light surface of the light engine are substantially in parallel with the light emitting axis, and there is an air gap located between the image surface and the projected light surface;
wherein among the light engine, the first light source corresponds to the first folding element and the first image area, the second light source corresponds to the second folding element and the second image area, the third light source corresponds to the third folding element and the third image area, and the light emitting axis and the projection lens assembly are disposed on a same optical path.

17. The projection device according to claim 16, wherein there is a heat dissipation layer disposed on at least one of a front surface and a rear surface of the circuit board.

18. The projection device according to claim 17, wherein the heat dissipation layer comprises a diamond-like-carbon coating, a thickness of the heat dissipation layer is Td, and the following condition is satisfied: 0.5 μm<Td<5.0 μm.

19. The projection device according to claim 17, wherein the heat dissipation layer includes a graphene coating.

20. The projection device according to claim 16, further comprising a time-of-flight sensing unit.

21. The projection device according to claim 16, wherein there is a diamond-like-carbon coating disposed on at least one of an inner surface and an outer surface of the casing.

22. A light engine, comprising:
an image surface, comprising a first image area, a second image area, and a third image area;
a projected light surface, comprising a first light source, a second light source, and a third light source, wherein the first light source, the second light source, and the third light source provide light with different wavelengths;
a projection lens assembly;
a plurality of folding elements, comprising a first folding element, a second folding element, and a third folding element that are arranged along a light emitting axis; and
an image providing device, having a front surface and a rear surface, the image surface is located on the front surface of the image providing device, and the image providing device comprises a light reducing layer with an anti-reflection subwavelength structure;
wherein the image surface and the projected light surface are substantially in parallel with the light emitting axis, and there is an air gap located between the image surface and the projected light surface;
wherein the first light source corresponds to the first folding element and the first image area, the second light source corresponds to the second folding element and the second image area, and the third light source corresponds to the third folding element and the third image area; the light emitting axis and the projection lens assembly are disposed on a same optical path.

23. The light engine according to claim 22, wherein the image surface is disposed between the projected light surface and the plurality of folding elements.

24. The light engine according to claim 23, wherein the image providing device comprises a liquid-crystal display.

25. The light engine according to claim 23, wherein at least one of the plurality of folding elements is a reflective element.

26. The light engine according to claim 23, wherein at least one of the plurality of folding elements is a dichroic mirror.

* * * * *